United States Patent
Iwaki

(10) Patent No.: US 12,243,120 B2
(45) Date of Patent: Mar. 4, 2025

(54) CONTENT DISTRIBUTION SYSTEM, CONTENT DISTRIBUTION METHOD, AND CONTENT DISTRIBUTION PROGRAM

(71) Applicant: DWANGO Co., Ltd., Tokyo (JP)

(72) Inventor: Shinnosuke Iwaki, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 129 days.

(21) Appl. No.: 17/668,293

(22) Filed: Feb. 9, 2022

(65) Prior Publication Data

US 2022/0270302 A1  Aug. 25, 2022

Related U.S. Application Data

(63) Continuation of application No. PCT/JP2020/036969, filed on Sep. 29, 2020.

(30) Foreign Application Priority Data

Sep. 30, 2019 (JP) .................. 2019-180710

(51) Int. Cl.
*G06T 11/00* (2006.01)
*G06T 13/00* (2011.01)
*G06V 20/20* (2022.01)

(52) U.S. Cl.
CPC .............. *G06T 11/00* (2013.01); *G06T 13/00* (2013.01); *G06V 20/20* (2022.01)

(58) Field of Classification Search
CPC ......... G06T 11/00; G06T 13/00; G06V 20/20; A63F 2300/5553; H04N 7/157
See application file for complete search history.

(56) References Cited

U.S. PATENT DOCUMENTS

2008/0015003 A1* 1/2008 Walker .................... A63F 13/45
  463/1
2009/0234948 A1* 9/2009 Garbow ................ A63F 13/358
  709/225

(Continued)

FOREIGN PATENT DOCUMENTS

CN  107735776 A  2/2018
JP  H10105541 A  4/1998

(Continued)

OTHER PUBLICATIONS

[English Translation] Notice of Reasons for Refusal mailed on Jan. 7, 2020 for Japanese Patent Application No. JP.2019180710.A.

(Continued)

*Primary Examiner* — Yi Yang
(74) *Attorney, Agent, or Firm* — Dorsey & Whitney LLP

(57) ABSTRACT

Content distribution systems for displaying a virtual space to user terminals, content distribution methods executed by a content distribution system including at least one processor, and non-transitory computer-readable media storing a content distribution program are disclosed. An example system according to the disclosure includes at least one processor that detects when an avatar corresponding to a first user performs a predetermined action in a virtual space, and displays a content image of the virtual space on a user terminal of a second user among the plurality of user terminals. The predetermined action is invisible in the content image when the processor detects that the avatar performs the predetermined action.

19 Claims, 8 Drawing Sheets

(56) References Cited

U.S. PATENT DOCUMENTS

| | | | |
|---|---|---|---|
| 2011/0010675 A1* | 1/2011 | Hamilton | H04L 63/107 |
| | | | 715/850 |
| 2011/0313874 A1* | 12/2011 | Hardie | G06Q 20/306 |
| | | | 705/26.1 |
| 2016/0134840 A1* | 5/2016 | McCulloch | G06V 40/165 |
| | | | 348/14.03 |
| 2017/0281054 A1* | 10/2017 | Stever | A61B 5/1114 |
| 2017/0310926 A1* | 10/2017 | Patel | H04N 21/4122 |
| 2018/0185753 A1* | 7/2018 | Nakagawa | G06F 3/011 |
| 2019/0204994 A1* | 7/2019 | Tippana | H04L 51/42 |

FOREIGN PATENT DOCUMENTS

| | | |
|---|---|---|
| JP | 2012014657 A | 1/2012 |
| JP | 2017102897 A | 6/2017 |
| JP | 2019155062 A | 9/2019 |
| WO | 2017002473 A1 | 1/2017 |

OTHER PUBLICATIONS

International Search Report and Written Opinion (English Translation for ISR only) mailed on Dec. 28, 2020 for PCT Application No. PCT/JP2020/036969.

* cited by examiner

CONTENT DISTRIBUTION SYSTEM, CONTENT DISTRIBUTION METHOD, AND CONTENT DISTRIBUTION PROGRAM

CROSS-REFERENCE TO RELATED APPLICATION(S)

This application is a continuation of PCT Application No. PCT/JP2020/036969 filed Sep. 29, 2020, which claims priority to Japanese Application No. 2019-180710 filed Sep. 30, 2019, which are incorporated herein by reference, in their entirety, for any purpose.

TECHNICAL FIELD

One aspect of the present disclosure relates to a content distribution system, a content distribution method, and a content distribution program.

BACKGROUND

There is a known a mechanism to switch whether or not to share the virtual space (virtual reality space) with other users according to the user's request. For example, Patent Document 1 discloses an information processing device that alternately switches between a shared mode in which a virtual space is shared with other users and a non-sharing mode in which the virtual space is not shared with other users by clicking a switch button is disclosed.

In the mechanism disclosed in Japanese Patent Application Publication No. 10-105541, for example, whether or not a virtual space is shared with another user depends on a mode selected by the user. Therefore, for example, even in a case where the action of the user's avatar in the virtual space should be hidden from other users (for example, a case where the avatar inputs a passcode or the like that should be hidden from other users in the virtual space), that action of the user's avatar may be seen by other users if user-selection is not appropriate (i.e. if the mode is set to the shared mode).

SUMMARY

In view of the above, it is an objective of the present disclosure to provide a content distribution system, a content distribution method, and a content distribution program each of which is capable of appropriately hiding actions made by a user's avatar in a virtual space from other users depending on a situation.

A content distribution system according to one aspect of the present disclosure is a content distribution system for distributing content expressing a virtual space to a plurality of user terminals, including at least one processor. The at least one processor detects a specific state where an avatar corresponding to a first user arranged in the virtual space makes a specific action that should be hidden from a second user different from the first user, and displays a content image expressing the virtual space in a form such that the specific action is not visible on the user terminal of the second user, when the specific state is detected.

According to one aspect of the present disclosure, it is possible to provide a content distribution system, a content distribution method, and a content distribution program each of which is capable of appropriately hiding an action made by a user's avatar in a virtual space from other users depending on a situation.

DETAILED DESCRIPTION

Figure 1:
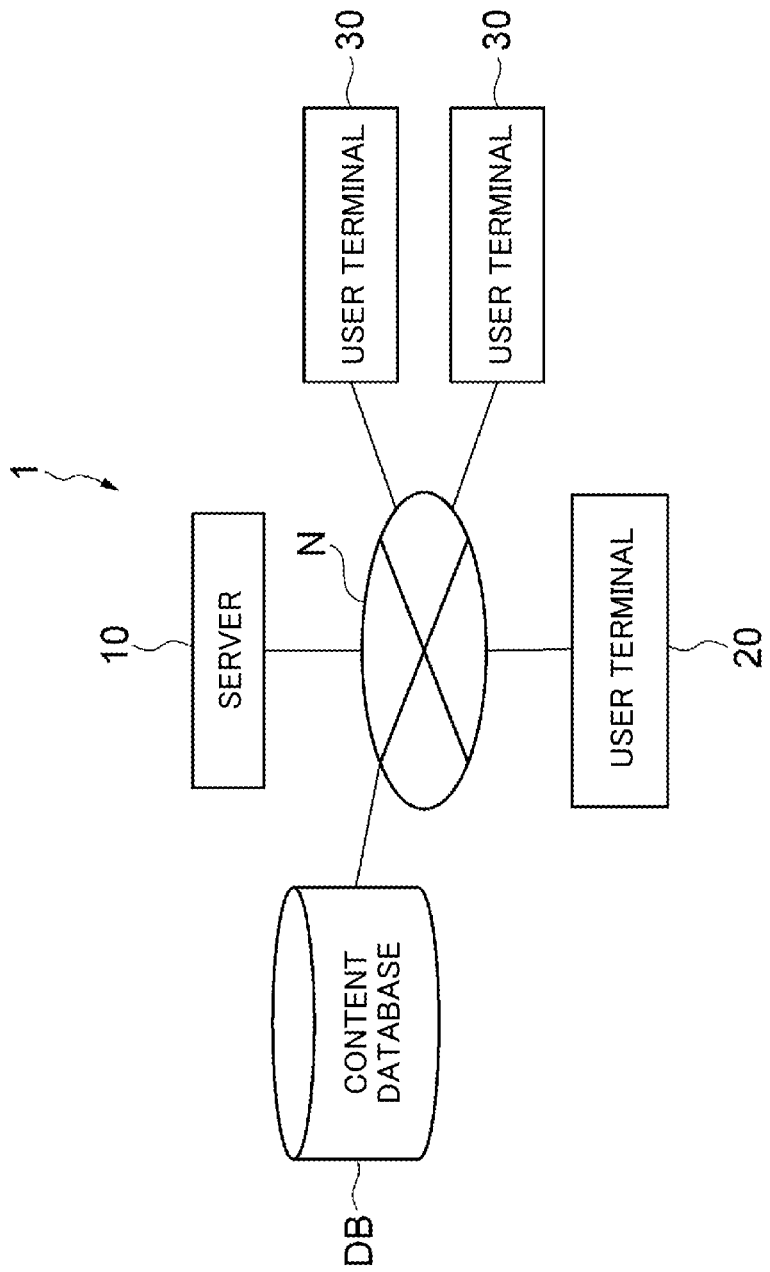
FIG. 1 is a diagram illustrating an exemplary application of a content distribution system in accordance with an embodiment.

Hereinafter, embodiments of the present disclosure will be described in detail with reference to the accompanying drawings. In the description of the drawings, the same or equivalent elements are denoted by the same reference numerals, and redundant description is omitted.

[Overview of System]

A content distribution system according to an embodiment is a computer system that distributes content to a plurality of users. Content is information provided by a computer or computer system that can be recognized by a person. Electronic data indicating content is referred to as content data. The form of expressing the content is not limited. Content may be expressed, for example, in the form of images (e.g. photographs, videos, etc.), documents, audio, music, or a combination of any two or more of these. The content may be used for various forms of conveying or communicating information. Content may be utilized for a variety of scenes or purposes such as, for example, entertainment, news, education, medical, gaming, chat, commerce, lecture, seminar, training, etc. Distribution is a process of transmitting information to a user via a communication network or a broadcast network.

The content distribution system provides content to a user by transmitting content data to a user terminal. In the present embodiment, for example, content expressing an identical virtual space is provided to user terminals of a plurality of users. This allows a plurality of users to share a common virtual space. Further, in the present embodiment, the content is expressed by using at least an image of a virtual space. That is, the content data includes at least a content image showing the content. The content image is an image from which a person can visually recognize some information. The content image may be a moving image (video) or a still image.

In one example, the content image expresses a virtual space with a virtual object. A virtual object is an object that does not exist in the real world and is present only on a computer system. A virtual object is expressed in the form of two-dimensional or three-dimensional computer graphics (CG) using an image material independent of a photographed image. A method of expressing the virtual object is not limited. For example, the virtual object may be expressed by using an animation material, or may be expressed in the form of an image as close to a real object based on a photographed image. The virtual space is a virtual two-dimensional or three-dimensional space presented in the form of an image displayed on a computer. The content image is, for example, an image showing a landscape viewed from a virtual camera set in the virtual space. The virtual camera is set in the virtual space so as to match with the line of sight of the user viewing the content image. The content image or the virtual space may further include a real-world object which is an object actually existing in the real world.

One example of a virtual object is an avatar, which represents the user him/herself. The avatar may be in the form of two-dimensional or three-dimensional computer graphics (CG) using an image material independent of an original image, instead of a photograph of a person oneself How the avatar is expressed is not limited. For example, the avatar may be in the form of an animation material, or may be an image as close to a real person based on a photographed image. Note that the position and direction of the virtual camera described above may coincide with the viewpoint and sight of the avatar. In this case, the content image of the first-person viewpoint is provided to the user. Alternatively, the position and direction of the virtual camera do not have to coincide with the viewpoint and sight of the avatar. For example, the virtual camera may be disposed in a space or the like on the back side of the avatar. In this case, the content image of the third-person viewpoint is provided to the user. By viewing the content image, the user can experience augmented reality (AR), virtual reality (VR), or mixed reality (MR).

In the present disclosure, the expression "transmitting" data or information from a first computer to a second computer means a transmission for final delivery of data or information to the second computer. That is, the expression encompasses a case where another computer or communication device relays data or information in the transmission.

The purpose and use scene of the content are not limited. In the present embodiment, for example, content provides a user with an experience similar to reality in a virtual facility provided in a virtual space shared by a plurality of users. For example, the content may provide the user with an experience of shopping at a shopping facility provided in the virtual space, or may provide the user with a gaming experience (for example, a so-called VR escape game, or the like) in the virtual space.

[Overall Configuration of Content Distribution System]

FIG. 1 is a diagram illustrating an exemplary application of a content distribution system 1 according to the embodiment. In the present embodiment, the content distribution system 1 includes a server 10, a plurality of user terminals 20 and 30, and a content database DB.

The server 10 is a computer that distributes content data to the user terminals 20 and 30. The server 10 is connected to each of the user terminals 20 and 30 and the content database DB via a communication network N. The configuration of the communication network N is not limited. For example, the communication network N may include the internet or an intranet.

The user terminals 20 and 30 are computers used by users who use content. In the present embodiment, each of the user terminals 20 and 30 have a function of capturing a video image, a function of accessing the content distribution system 1 and transmitting electronic data (video data) representing the video image, and a function of receiving and displaying content data from the content distribution system 1. The type and configuration of the user terminals 20 and 30 are not limited. For example, each of the user terminals 20 and 30 may be a mobile terminal such as a high-function mobile phone (smartphone), a tablet terminal, a wearable terminal (for example, a head-mounted display (HMD), smart glasses, or the like), a laptop personal computer, or a mobile phone. Alternatively, each of the user terminals 20 and 30 may be a stationary terminal such as a desktop personal computer.

In this embodiment, the user terminal 20 is a user terminal of one user (first user) focused among a plurality of users (i.e. a user terminal used by the first user), and the user terminal 30 is a user terminal of another user (second user) different from the first user (i.e. a user terminal used by the second user). Although FIG. 1 illustrates two user terminals 30, the number of user terminals 30 (i.e. the number of second users) is not particularly limited. As described, in the present embodiment, when attention is paid to a certain user, the user is referred to as a first user and another user is referred to as a second user, for the sake of convenience. Therefore, the user terminal 20 and the user terminal 30 have the same hardware configuration and functional configuration. That is, each user terminal functions as the user terminal 20 described later in a certain scene, and functions as a user terminal 30 described later in another scene.

For example, the user can use the content by operating the user terminal 20 or 30 to log into the content distribution system 1. For example, a user can have various experiences in a virtual space expressed by content via his/her avatar. In this embodiment, it is assumed that the user of the content distribution system 1 has already logged in.

The content database DB is a non-transitory storage medium or storage device that stores generated content data. The content database DB can be said to be a library of existing content. The content data is stored in the content database DB by any computer such as the server 10, the user terminals 20 and 30, or another computer.

The content data is stored in the content database DB in association with a content ID that uniquely identifies the content. In one example, the content data includes virtual space data, model data, and a scenario.

The virtual space data is electronic data representing a virtual space constituting the content. For example, the virtual space data may include information indicating the arrangement of individual virtual objects constituting the background, the position of the virtual camera, the position of a virtual light source, or the like.

The model data is electronic data used to define the specifications of virtual objects constituting the content. The specifications of virtual objects show rules or methods for controlling the virtual objects. For example, the specification of a virtual object includes at least one of a configuration (for example, a shape and a dimension), an action, and a sound of the virtual object. The data structure of the model data of the avatar is not limited and may be designed in any given way. For example, the model data may include information on a plurality of joints and a plurality of bones constituting the avatar, graphic data representing an appearance design of the avatar, an attribute of the avatar, and an avatar ID serving as an identifier of the avatar. Examples of the information on joints and bones include three-dimensional coordinates of individual joints and combinations of adjacent joints (i.e. bones). However, the configuration of the information is not limited to this, and may be designed in any given way. The attribute of the avatar may be any piece of information that characterizes the avatar, and may include, for example, nominal dimensions, voice quality, or personality.

The scenario is electronic data that defines the motion of individual virtual objects, virtual cameras or virtual light sources over time in a virtual space. The scenario can be said to be information for determining a story of the content. The action of the virtual object is not limited to movement that can be recognized visually, but may include generation of sound that can be recognized aurally.

The content data may include information about the real-world object. For example, the content data may include a photographed image of a real-world object. In a case where the content data includes a real-world object, the scenario may further specify where and when the real-world object is to be projected.

A position of installing the content database DB is not limited. For example, the content database DB may be provided in a computer system apart from the content distribution system 1, or may be a component of the content distribution system 1.

[Hardware Configuration of Content Distribution System]

Figure 2:
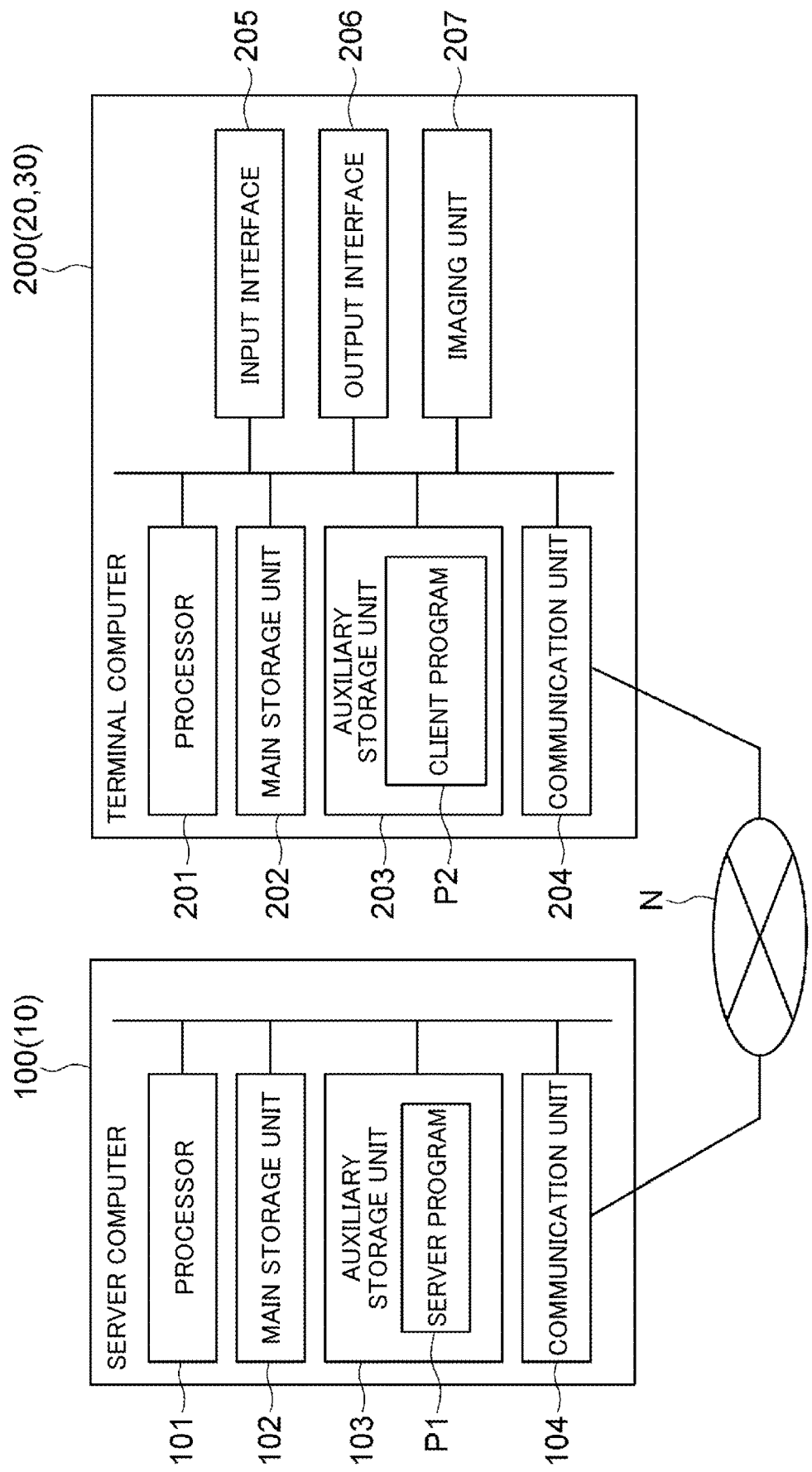
FIG. 2 is a diagram illustrating an exemplary hardware configuration related to the content distribution system of FIG. 1.

FIG. 2 is a diagram illustrating an exemplary hardware configuration related to the content distribution system 1. FIG. 2 shows a server computer 100 serving as the server 10, and a terminal computer 200 serving as the user terminal 20 or the user terminal 30.

For example, the server computer 100 includes a processor 101, a main storage unit 102, an auxiliary storage unit 103, and a communication unit 104 as hardware components.

The processor 101 is a computing device that executes an operating system and application programs. Examples of the processor include a central processing unit (CPU) and a graphics processing unit (GPU), but the type of the processor 101 is not limited to these. For example, the processor 101 may be a combination of sensors and a dedicated circuit. The dedicated circuit may be a programmable circuit such as a field-programmable gate array (FPGA) or another type of circuit.

The main storage unit 102 is a device that stores a program for achieving the server 10 and computation results output from the processor 101, and the like. The main storage unit 102 is configured by, for example, a read only memory (ROM) or random access memory (RAM).

The auxiliary storage unit 103 is generally a device capable of storing a larger amount of data than the main storage unit 102. The auxiliary storage unit 103 is configured by a non-volatile storage medium such as a hard disk or a flash memory. The auxiliary storage unit 103 stores a server program P1 that causes the server computer 100 to function as the server 10 and stores various types of information. For example, the auxiliary storage unit 103 may store data related to at least one of the virtual object (e.g. the avatar) and the virtual space. In the present embodiment, the content distribution program is implemented as a server program P1.

The communication unit 104 is a device that executes data communication with another computer via the communication network N. The communication unit 104 is configured by, for example, a network card or a wireless communication module.

Each functional element of the server 10 is realized by having the processor 101 or the main storage unit 102 read the server program P1 and having the processor 101 execute the server program P1. The server program P1 includes codes that achieves the functional elements of the server 10. The processor 101 operates the communication unit 104 according to the server program P1, and executes reading and writing from and to the main storage unit 102 or the auxiliary storage unit 103. Through such processing, each functional element of the server 10 is achieved.

The server 10 may be constituted by one or more computers. In a case of using a plurality of computers, the computers are connected to each other via a communication network, so as to configure a logically single server 10.

As an example, the terminal computer 200 includes, as hardware components, a processor 201, a main storage unit 202, an auxiliary storage unit 203, a communication unit 204, an input interface 205, an output interface 206, and an imaging unit 207.

The processor 201 is a computing device that executes an operating system and application programs. The processor 201 may be, for example, a CPU or a GPU, but the type of the processor 201 is not limited to these.

The main storage unit 202 is a device that stores a program for achieving the user terminal 20 or 30, computation results output from the processor 201, and the like. The main storage unit 202 is configured by, for example, a ROM or a RAM.

The auxiliary storage unit 203 is generally a device capable of storing a larger amount of data than the main storage unit 202. The auxiliary storage unit 203 is configured by a non-volatile storage medium such as a hard disk or a flash memory. The auxiliary storage unit 203 stores a client program P2 for causing the terminal computer 200 to function as the user terminal 20 or 30, and various information. For example, the auxiliary storage unit 203 may store data related to at least one of a virtual object such as an avatar and a virtual space.

The communication unit 204 is a device that executes data communication with another computer via the communication network N. The communication unit 204 is configured by, for example, a network card or a wireless communication module.

The input interface 205 is a device that receives data based on a user's operation or action. For example, the input interface 205 includes at least one of a controller, a keyboard, an operation button, a pointing device, a microphone, a sensor, or a camera. The keyboard and the operation button may be displayed on the touch panel. The type of the input interface 205 is not limited, and neither is data input to the input interface 205. For example, the input interface 205 may receive data input or selected by a keyboard, an operation button, or a pointing device. Alternatively, the input interface 205 may receive audio data input through a microphone. Alternatively, the input interface 205 may receive image data (for example, video data or still image data) taken by a camera. Alternatively, the input interface 205 may receive, as motion data, data representing a user's non-verbal activity (e.g. line of sight, gesture, facial expression, or the like) detected by a motion capture function using a sensor or a camera.

The output interface 206 is a device that outputs data processed by the terminal computer 200. For example, the output interface 206 is configured by at least one of a monitor, a touch panel, an HMD, or a speaker. A display device such as a monitor, a touch panel, or an HMD displays processed data on a screen. The speaker outputs a sound represented by the processed audio data.

The imaging unit 207 is a device that captures an image of the real world, and is a camera, specifically. The imaging unit 207 may capture a moving image (video) or a still image (photograph). In a case of capturing a moving image, the imaging unit 207 processes video signals based on a given frame rate so as to yield a time-sequential series of frame images as a moving image. The imaging unit 207 can also function as the input interface 205.

Each functional element of each of the user terminals 20 and 30 is achieved by having the processor 201 or the main storage unit 202 read the client program P2 and execute the client program P2. The client program P2 includes code for achieving each functional element of the user terminals 20 and 30. The processor 201 operates the communication unit 204, the input interface 205, the output interface 206, or the imaging unit 207 in accordance with the client program P2 to read and write information from and to the main storage unit 202 or the auxiliary storage unit 203. Through this processing, each functional element of the user terminals 20 and 30 is achieved.

At least one of the server program P1 or the client program P2 may be provided after being fixedly recorded on a tangible recording medium such as a CD-ROM, a DVD-ROM, or a semiconductor memory. Alternatively, at least one of these programs may be provided via a communication network as a data signal superimposed on a carrier wave. These programs may be separately provided or may be provided together.

[Functional Configuration of Content Distribution System]

Figure 3:
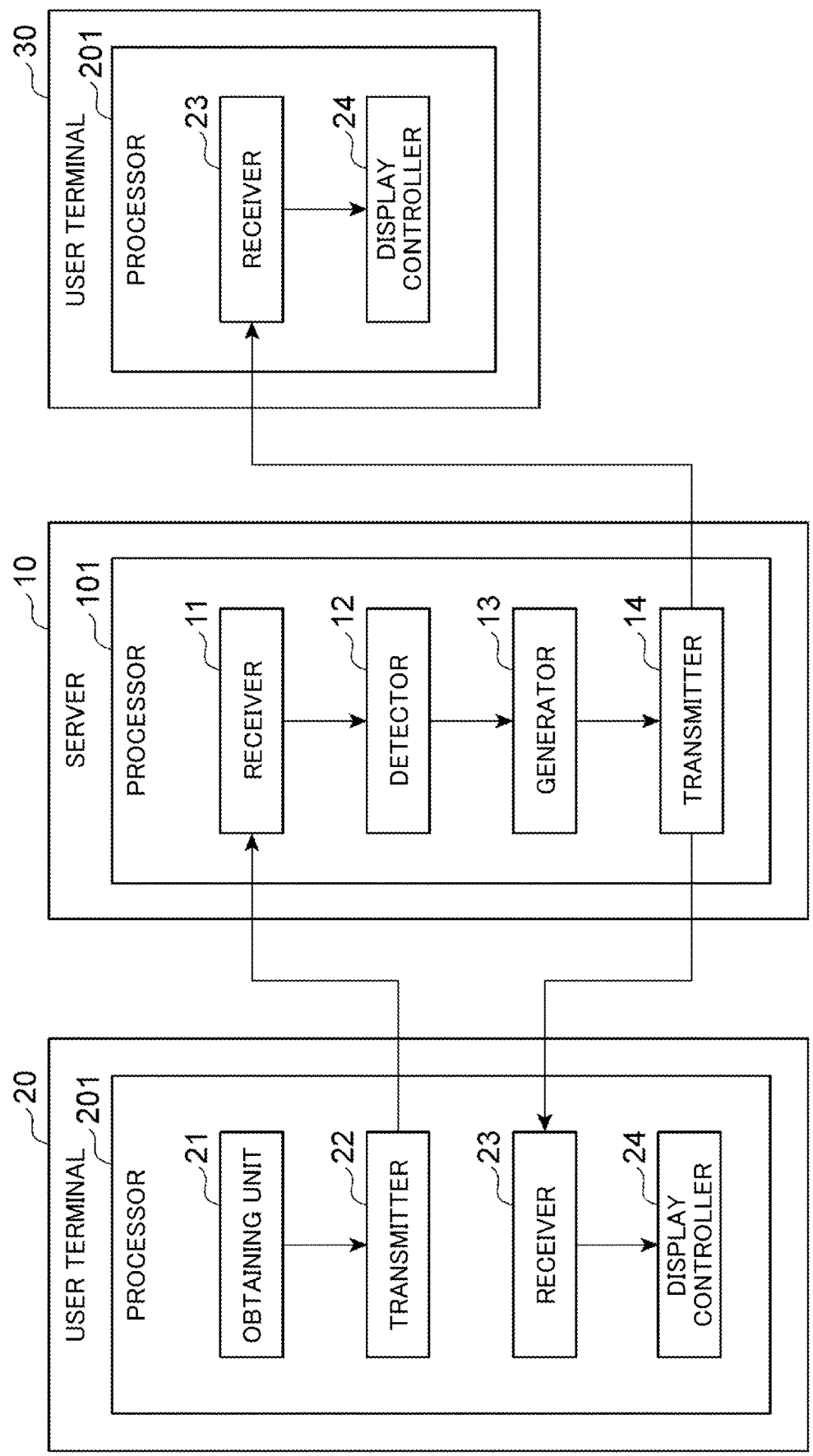
FIG. 3 is a diagram illustrating an exemplary functional configuration related to the content distribution system of FIG. 1.

FIG. 3 is a diagram illustrating an example of a functional configuration related to the content distribution system 1. The server 10 includes a receiver 11, a detector 12, a generator 13, and a transmitter 14 as functional elements.

The receiver 11 receives a data signal transmitted from the user terminal 20. The data signal may include at least one of action information or operation information. The action information is information defining the action of an avatar arranged in the virtual space, which corresponds to a first user (hereinafter referred to simply as "avatar"). The operation information is information instructing execution of an event other than the action of the avatar (for example, invocation of a setting screen).

The detector 12 detects a specific state in which the avatar makes the specific action, based on a data signal received from the user terminal 20. The specific action is an action determined in advance as an action to be hidden from the second user. For example, the specific action is an action of the first user inputting information that should not be known by another user (second user) in the virtual space. Examples of such information include a password such as a personal identification number (PIN) code. Examples of such a specific action include an action of pressing an operation button on a virtual input device arranged in the virtual space, by using a finger of the avatar. The specific state may include not only a state in which the above-described specific action is taking place, but also a state in which the specific action is about to take a place (i.e. a state immediately before the specific action taking place).

The generator 13 generates content data to be distributed to each user (i.e. each of the user terminals 20 and 30) according to the detection result from the detector 12. The content data includes content image data related to a content image to be displayed on the display device of each of the user terminals 20 and 30. The content data may include data other than images (for example, audio, or the like). The transmitter 14 transmits the content data generated by the generator 13 to each of the user terminals 20 and 30.

The user terminal 20 includes an obtaining unit 21, a transmitter 22, a receiver 23, and a display controller 24 as functional elements.

The obtaining unit 21 obtains the action information or operation information received through the input interface 205 of the user terminal 20. The action information is, for example, the above-described motion data. In this case, the action of the first user in the real space is reflected in the action of the avatar in the virtual space. Alternatively, the action information may be information indicating the content of a predetermined input operation by the user on the controller. In this case, the action corresponding to the content of the input operation is reflected as the action of the avatar, and the action of the first user in the real space is not directly reflected in the action of the avatar. As described above, the action information that defines the action of the avatar may or may not reflect the actual action of the first user. Examples of the operation information include information indicating an operation that causes a virtual object (a non-shared object to be described later) for inputting a password such as the above-described PIN code to appear in the virtual space.

The transmitter 22 transmits the operation information or the action information obtained by the obtaining unit 21 to the server 10. The receiver 23 receives content data including content image data from the server 10. The display controller 24 is a functional element that displays content on the display device of the user terminal 20 based on the content data received by the receiver 23.

As described above, the user terminal 30 includes functional elements similar to those of the user terminal 20. Note that, in the present embodiment, FIG. 3 illustrates only the receiver 23 and the display controller 24 for executing the processing, for a purpose of focusing on the processing at a time of displaying the content expressing the virtual space including the avatar of the first user on the user terminal 30 of a second user.

[Operation of Content Distribution System]

Figure 4:
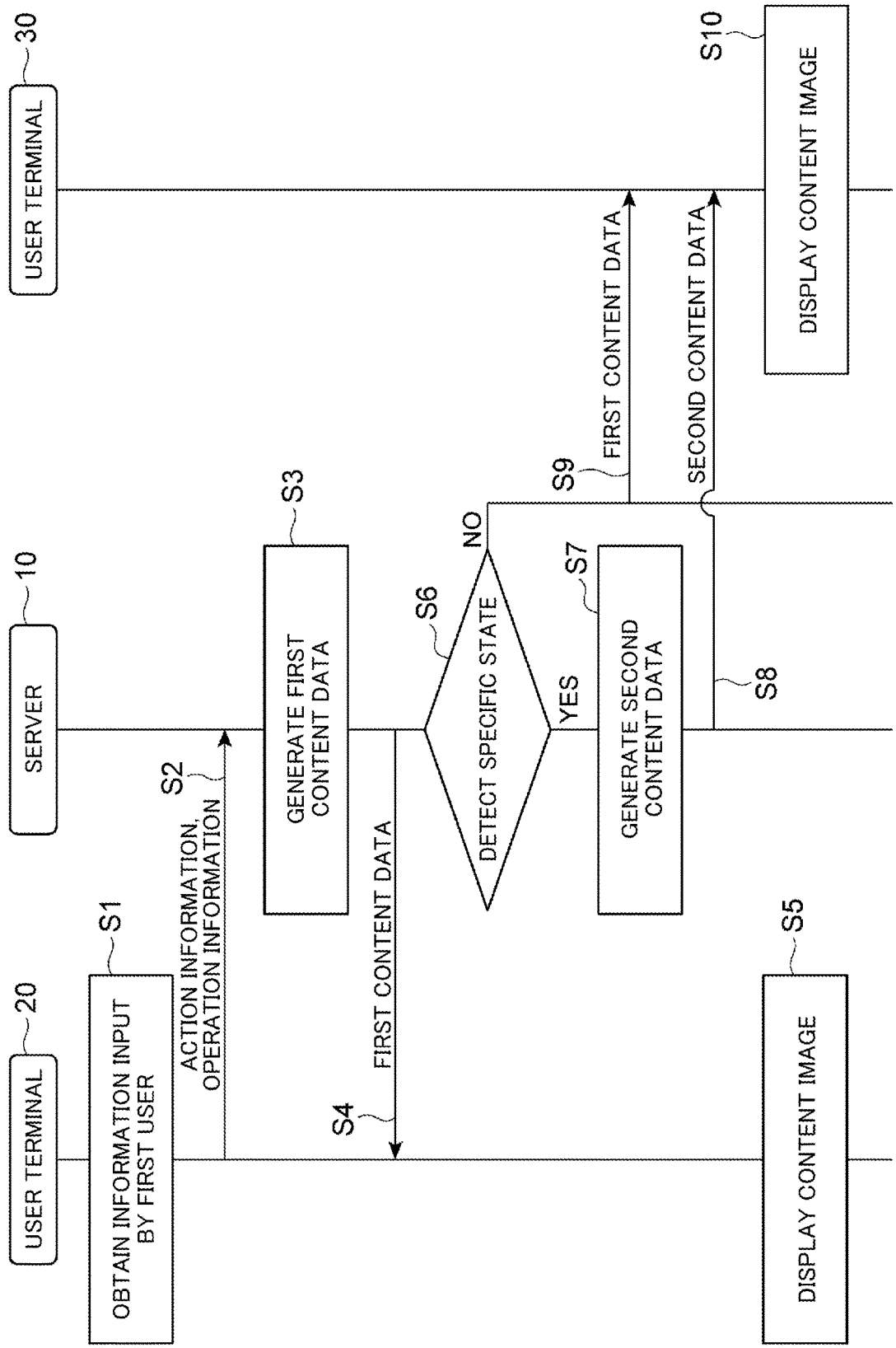
FIG. 4 is a sequence diagram illustrating an exemplary operation of the content distribution system of FIG. 1.

With reference to FIG. 4, the following describes an operation of the content distribution system 1 (more specifically, an operation of the server 10) as well as a content distribution method according to the present embodiment. FIG. 4 is a sequence diagram showing an exemplary operation of the content distribution system 1.

First, the obtaining unit 21 of the user terminal 20 of the first user obtains information input by the first user. More specifically, the obtaining unit 21 obtains the above-described action information or operation information (step S1). Subsequently, the transmitter 22 of the user terminal 20 transmits the action information or the operation information obtained by the obtaining unit 21 to the server 10 (step S2). The action information or the operation information is received by the receiver 11 of the server 10.

Subsequently, the generator 13 of the server 10 generates first content data based on the action information or the operation information obtained by the receiver 11 (step S3). The first content data includes first content image data. When the receiver 11 obtains the action information, the generator 13 generates the first content image data representing the virtual space including the avatar that moves based on the action information. When the receiver 11 acquires the operation information, the generator 13 generates the first content image data representing the virtual space changed based on the operation information. When the action of the avatar acts on a virtual object arranged in the virtual space (for example, when a part of the avatar contacts another virtual object), the generator 13 may compute a behavior taking place in the virtual space due to the action (for example, movement or deformation of the avatar or the other virtual object). In this case, the first content image data may include information of the virtual space reflecting the behavior resulting from the computation (i.e. a state reflecting movement, deformation, or the like of each virtual object).

The first content image data is data related to a content image expressing the virtual space showing the state of the avatar reflecting the action information of the first user (i.e. an action of the avatar corresponding to the action information of the first user), in a visually recognizable manner. The first content image data may be the content image itself, or may be data for generating this content image. In the former case, the first content image data is the content image itself generated through rendering based on information related to the state of each virtual object (including an avatar) in the virtual space (i.e. rendered data). In the latter case, the first content image data is data based on which the content image is generated through a rendering process (i.e. data before rendering).

Figure 5:
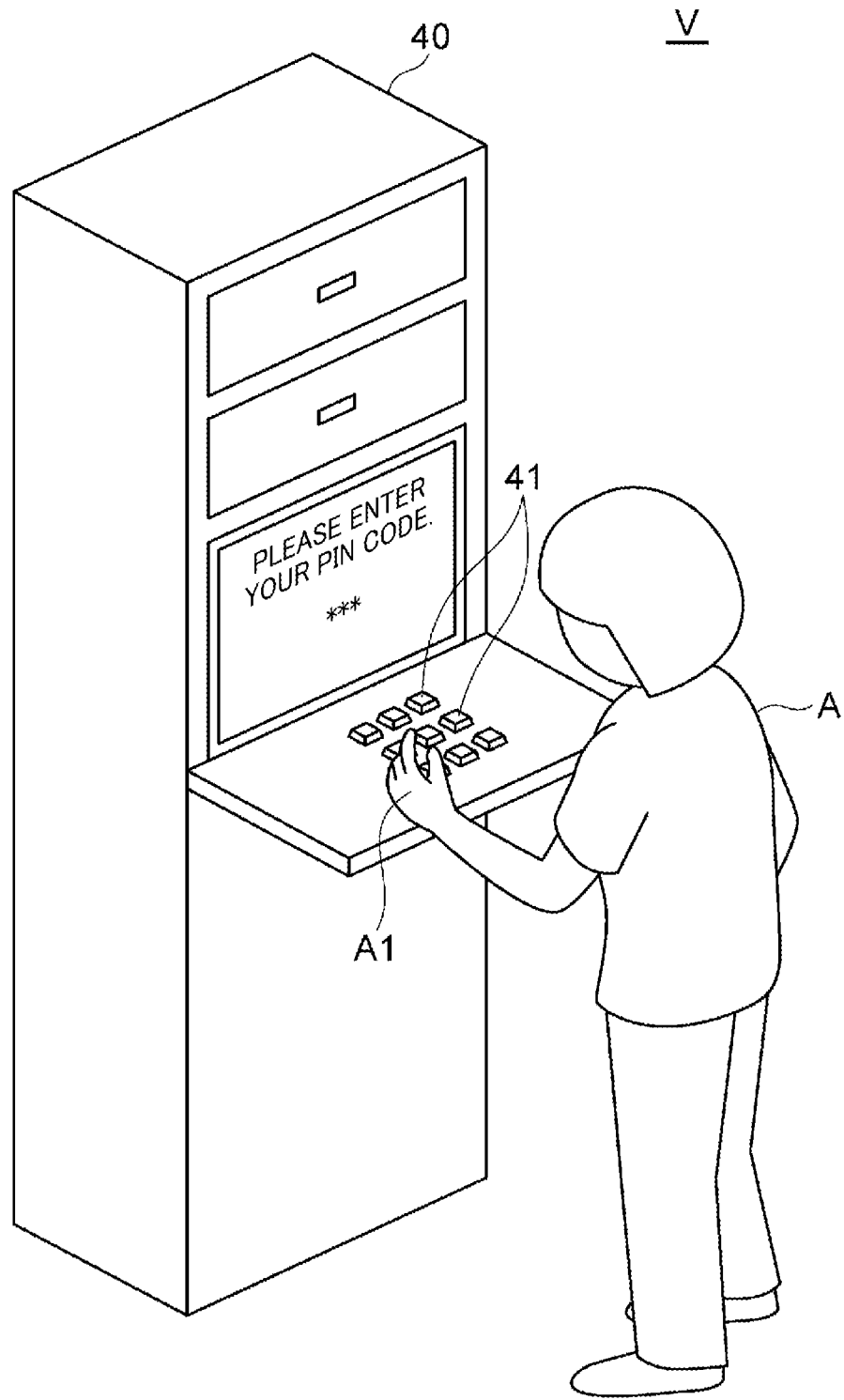
FIG. 5 is a diagram illustrating an exemplary virtual space related to a first content image.

FIG. 5 is a diagram illustrating an exemplary virtual space related to the first content image. FIG. 5 illustrates a scene where the first user is shopping (making a payment) via an avatar A corresponding to the first user in a virtual space V. In this example, to make a purchase in the shopping (make a payment) in the virtual space V, the avatar A operates a virtual object 40 that simulates a device for inputting a passcode (e.g. a PIN code). More specifically, when an input button 41 on the virtual object 40 is pressed by the action of the hand A1 of the avatar A, information (for example, a number or the like) corresponding to the input button 41 pressed is input. The first content image is an image showing the virtual space V expressing such an action of the avatar A. That is, if the hand A1 of the avatar A is within the shooting range according to the position and the direction of the virtual camera, the motion of the hand A1 of the avatar A is visually recognizable in the first content image.

No particular issues arise in providing such a first content image reflecting the action of the avatar A to the user corresponding to the avatar A (i.e. the first user). Rather, the first user needs to check the movement of the finger of the avatar A corresponding to the movement of his/her finger (or a predetermined operation on the controller) by viewing the first content image to accurately perform the input operation of the passcode via the avatar A. However, there will be an issue in terms of security, when the movement of the finger of the avatar A is visible to a second user other than the first user (i.e. when the passcode of the first user is stolen). To address this, the server 10 performs the following processing.

As described above, it is preferable that the first content image reflecting the action of the avatar A be provided to the first user. Therefore, the server 10 transmits the first content data to the user terminal 20 of the first user. More specifically, the transmitter 14 transmits the first content data to the user terminal 20 (step S4). The first content data is received by the receiver 23 of the user terminal 20. Then, the display controller 24 of the user terminal 20 processes the first content image data included in the first content data to display the content image on its display device (step S5). When the server 10 executes the rendering (i.e. when the first content image data is a content image itself), the display controller 24 may display the content image as it is. On the other hand, when the server 10 is not rendering, the display controller 24 may generate and display a content image through a rendering process based on the first content image data.

On the other hand, as illustrated in FIG. 5, in a state (specific state) where the avatar A makes an action (specific action) that should be hidden from the second user in the virtual space V, it is not preferable to provide, to the second user, the content image reflecting such a specific action of the avatar A, in terms of security. To address this, the detector 12 of the server 10 first detects the specific state of the avatar A making the specific action (step S6). The information defining the specific action or the specific state is stored in advance in a location that can be referred to by the server 10 (for example, the content database DB, the auxiliary storage unit 103, or the like).

When the specific state is detected by the detector 12 (step S6: YES), the generator 13 generates second content data including second content image data relating to a content image of the virtual space V such that the specific action cannot be seen (step S7). Then, the transmitter 14 transmits the second content data to the user terminal 30 of the second user (step S8). The second content data is received by the receiver 23 of the user terminal 30. Then, the display controller 24 of the user terminal 30 processes the second content image data included in the second content data to display the content image on its display device (step S10). When the server 10 executes the rendering (i.e. when the second content image data is a content image itself), the display controller 24 may display the content image as it is. On the other hand, when the server 10 is not rendering, the display controller 24 may generate and display a content image through rendering based on the second content image data. In this way, the user terminal 30 is provided with the second content image such that the specific action of the avatar is not visible, and the content of the specific action can be concealed from the second user. As a result, it is possible to avoid leakage of the confidential information of the first user to the second user, achieving suitable security in the virtual space.

When the specific state is not detected by the detector 12 (step S6: NO), the generator 13 does not need to generate the content data for the second user (i.e. the content image in which the specific action is concealed). Therefore, in this case, the second content data generation process (step S7) performed by the generator 13 is omitted, and the transmitter 14 transmits the first content data to the user terminal 30 of the second user (step S9). In this case, in step S10, a content image corresponding to the first content image data is displayed on the display device.

Next, the following describes some examples (first to third detection processes) of the detection process performed by the detector 12 in the above-described step S6.

(First Detection Process)

In the first detection process, the specific action is determined in advance as an action (operation) with respect to a predetermined specific virtual object (Hereinafter referred to as "specific object"). The specific object is a virtual object to be a target of the specific action by the avatar. In the example of FIG. 5, when the virtual object 40 is determined in advance as the specific object, for example, an input operation on the input button 41 of the virtual object 40 may be determined in advance as the specific action. In this case, the detector 12 can detect, as the specific state, a state where the avatar A makes the specific action on the virtual object 40 (here, an input operation on the input button 41).

For example, the detector 12 may detect a state where the avatar is within a predetermined distance range from the specific object based on the position of the specific object arranged in the virtual space V and the position of the avatar A in the virtual space V. Upon detection of such a state, the specific state may be detected. In the example of FIG. 5, the detector 12 calculates, for example, a distance d1 between the position of the virtual object 40 (for example, the position coordinates of the input button 41 in the virtual space V) and the position of the avatar A (for example, the position coordinates of the hand A1 of the avatar A in the virtual space V). Then, the detector 12 compares the distance d1 with a preset threshold Th. When the distance d1 is not more than the threshold Th (or the distance d1 is less than the threshold Th), the specific state can be detected. In this case, by setting the threshold Th to a relatively large value, the specific state can be detected at a time point before the time point where the specific action of the avatar A is actually started.

(Second Detection Process)

In the second detection process, the specific action is determined in advance as an action (operation) with respect to a virtual object that is visible only to the first user (Hereinafter referred to as "non-shared object"). For example, the server 10 may generate the non-shared object in the virtual space in response to the operation information related to a predetermined operation by the first user (for example, a predetermined operation on the controller (input interface 205) of the user terminal 20). The non-shared object is an object that is visually recognizable only by the first user, and is a virtual object that is controlled so as not to be displayed in the content image distributed to the second user. The non-shared object is a virtual object that accepts only an operation via the avatar of the first user.

In the example of FIG. 5, the following discusses a case where the virtual object 40 is a non-shared object generated in the virtual space V, with a predetermined operation by the first user as a trigger. Here, an occurrence of the virtual object 40 that is an operation target of the avatar A and is a non-shared object in the virtual space V means that the avatar A is about to perform an operation (specific action) on the non-shared object. Therefore, the detector 12 may detect the specific state in response to the occurrence of the virtual object 40 that is a non-shared object in the virtual space V. Also in this case, the specific state can be detected at a time point before the specific action of the avatar A is actually started.

(Third Detection Process)

In the third detection process, a template defining the specific action is stored in advance in a location that can be referred to by the server 10 (for example, the content database DB, the auxiliary storage unit 103, or the like). An example of the template is information indicating a pattern that characterizes the movement of the hand A1 of the avatar A in an operation of inputting a passcode. For example, a template corresponding to such an action is information indicating a pattern of an action by the hand A1 when the fingertips of the hand A1 of the avatar A continuously make an action of pointing a plurality of different places. The template is not limited to a specific data format as long as the similarity to the actual action of the avatar A (i.e., the action information received from the user terminal 20 in step S2) can be calculated. In this case, the detector 12 compares the action information obtained in step S2 with the template to detect the action information defining the specific action (Hereinafter referred to as "specific action information"). In response to this detection of the specific action information, the detector 12 detects the specific state.

For example, the detector 12 calculates the similarity between the action information obtained in step S2 and the template through a predetermined calculating process. Then, the detector 12 compares the similarity with a preset threshold to determine whether or not the motion information obtained in step S2 corresponds to the specific action information. For example, the detector 12 may determine that the motion information obtained in step S2 corresponds to the specific action information in a case where the similarity is equal to or greater than the threshold (or greater than the threshold). Then, when the specific action information (i.e., the action information obtained in step S2) is detected in this manner, the detector 12 detects the specific state.

Next, the following describes some examples (first to third generation processes) of the generation process by the generator 13 in the above-described step S7.

(First Generation Process)

In the first generation process, the generator 13 generates the second content image data that does not include the specific action information among pieces of the action information defining the action to be made by the avatar A in the virtual space V. When the second content image data is data before rendering, the second content image data does not include the specific action information obtained in step S2. For example, to generate the second content image data that does not include the specific action information, the generator 13 includes, in the second content image data, information excluding the specific action information from the action information obtained in step S2. On the other hand, when the second content image data is rendered data (i.e., the content image itself), the second content image data is a content image generated based on information excluding the specific action information from the specific action obtained in step S2. For example, the generator 13 determines the action of the avatar A based on the information excluding the specific action information from the action information obtained in step S2, and generates a content image reflecting the action of the avatar A, thereby generating the second content image data after rendering, not including the specific action information.

In any of the above cases, the specific action information is not transmitted from the server 10 to the user terminal 30. As a result, the second content image such that the specific action of the avatar A is not visually recognizable (i.e., the specific action of the avatar A is not expressed) is displayed on the display device of the user terminal 30. Further, the specific action information is not included in the second content image data itself transmitted to the user terminal 30. The second user thus cannot grasp the specific action of the avatar A even if the second content image data is analyzed. That is, not only the specific action of the avatar A cannot be visually recognized in the second content image displayed on the display device of the user terminal 30, but also the specific action of the avatar A cannot be grasped even if the second content image data is analyzed. Therefore, the second content image data generated in the first generation process achieves effective confidentiality (security) of the specific action.

Note that the generator 13 may generate the second content image data based on the information excluding all the action information from a time point of detecting the specific state to a time point when the specific state is no longer detected from the action information obtained in step S2. For example, in a case where the first detection process described above is executed, the generator 13 may generate the second content image data after excluding action information related to actions taking place during a period from detection of the specific state to a time point when the specific action is actually performed (for example, a preceding action of approaching to the virtual object 40 to press the input button 41). In this way, it is possible to hide from the second user, not only a specific action of the avatar, but also the preceding action for executing the specific action. As a result, the confidentiality of the specific action is further enhanced.

Figure 6:
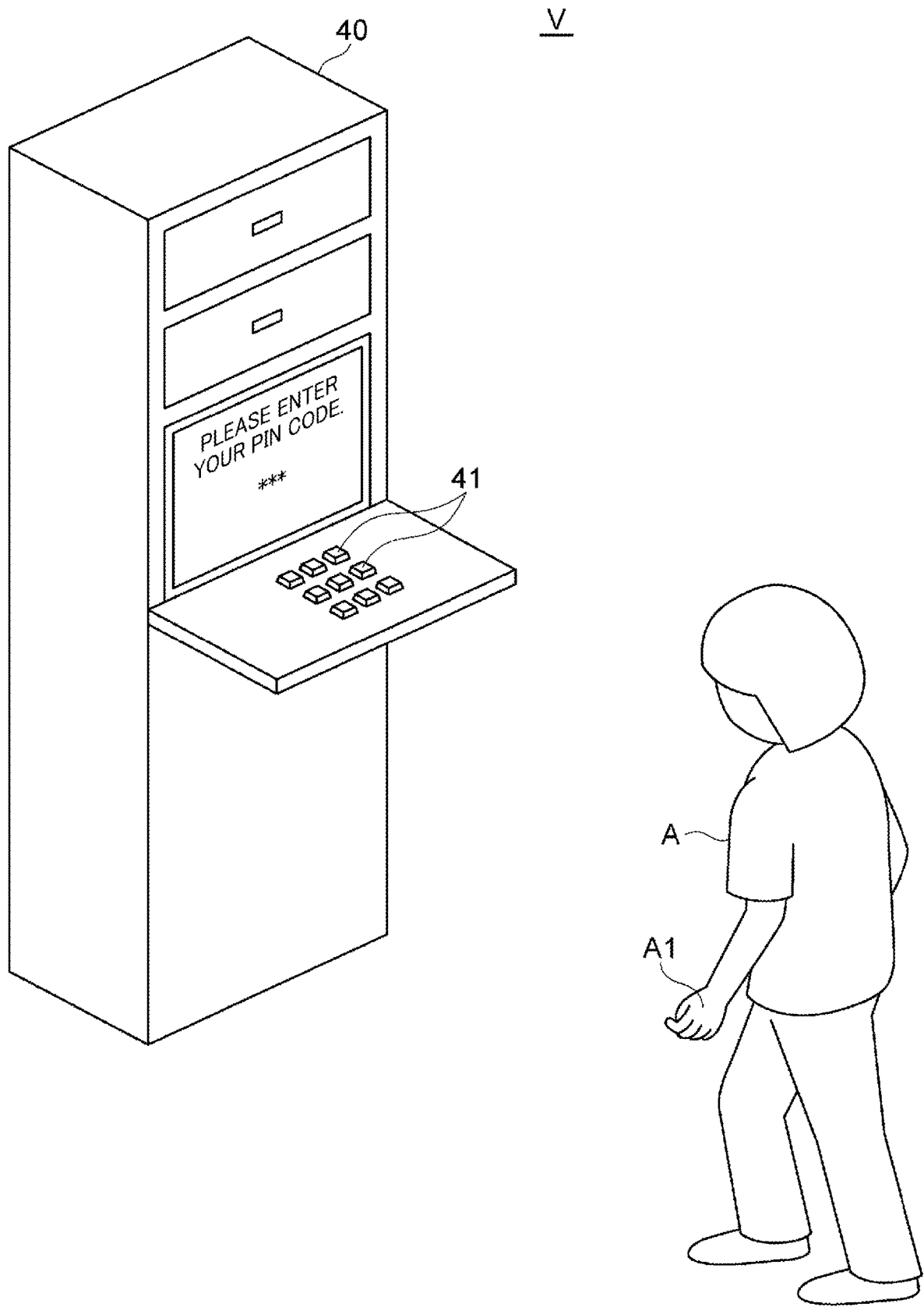
FIG. 6 is a diagram for explaining a second content image according to a first generation process.

FIG. 6 is a diagram for explaining the second content image related to the second content image data generated in the first generation process. Here, as an example, the detector 12 detects a specific state in response to detection, through the first detection process, of a state where the hand A1 of the avatar A is within the threshold distance range of the input button 41 of the virtual object 40. Then, the generator 13 generates the second content image data without using the action information related to the action of the avatar A after the specific state is detected (i.e., the action of approaching to the virtual object 40 and pressing the input button 41 with the hand A1). As a result, the second content image data representing a virtual space V (see FIG. 6) in which the specific action and the above-described preceding action of the avatar A cannot be visually recognized is generated. That is, in this example, the action of the avatar A after the specific state is detected is not expressed in the second content image. As a result, the second user is provided with the second content image (here, an image such that the avatar A is stopped at the time when the specific state is detected) that is not synchronized with the first content image (an image such that the actual action of the avatar A is reflected) which is provided to the first user. When the virtual object 40 is the above-described non-shared object, the virtual object 40 is not shown in the second content image. When the detector 12 performs the second detection process, the generator 13 may generate the second content image data without using the action information of the avatar during a period from an occurrence of the non-shared object the virtual space to disappearance of the non-shared object disappears from the virtual space. Also in this case, as shown in FIG. 6, an image with the avatar stopped at a certain time point (here, a time point at which the non-shared object occurs in the virtual space) is provided to the second user.

As described above, by providing the second user with the second content image with the avatar A being stopped, when the specific state is detected, the specific action of the avatar A can be hidden from the second user. However, the second user visually recognizes a state where the avatar A is unnaturally stopped. The second user may thus feel a sense of strangeness, and may impair the feeling of immersion in the virtual space V. To address this, the generator 13 may execute the following second generation process.

(Second Generation Process)

In the second generation process, the generator 13 generates the second content image data related to the content image in which an object that covers and hides the specific action is arranged. Such an object is an object that covers at least a portion related to a specific action of the avatar. For example, the second content image related to the second content image data is obtained by superimposing a mosaic object on a content image in which the action of the avatar A is expressed based on the action information (including specific action information) obtained in step S2. In this case, when the specific state is detected by the detector 12, the server 10 can display, on the user terminal 30 of the second user, the second content image with the object covering the specific action.

Figure 7:
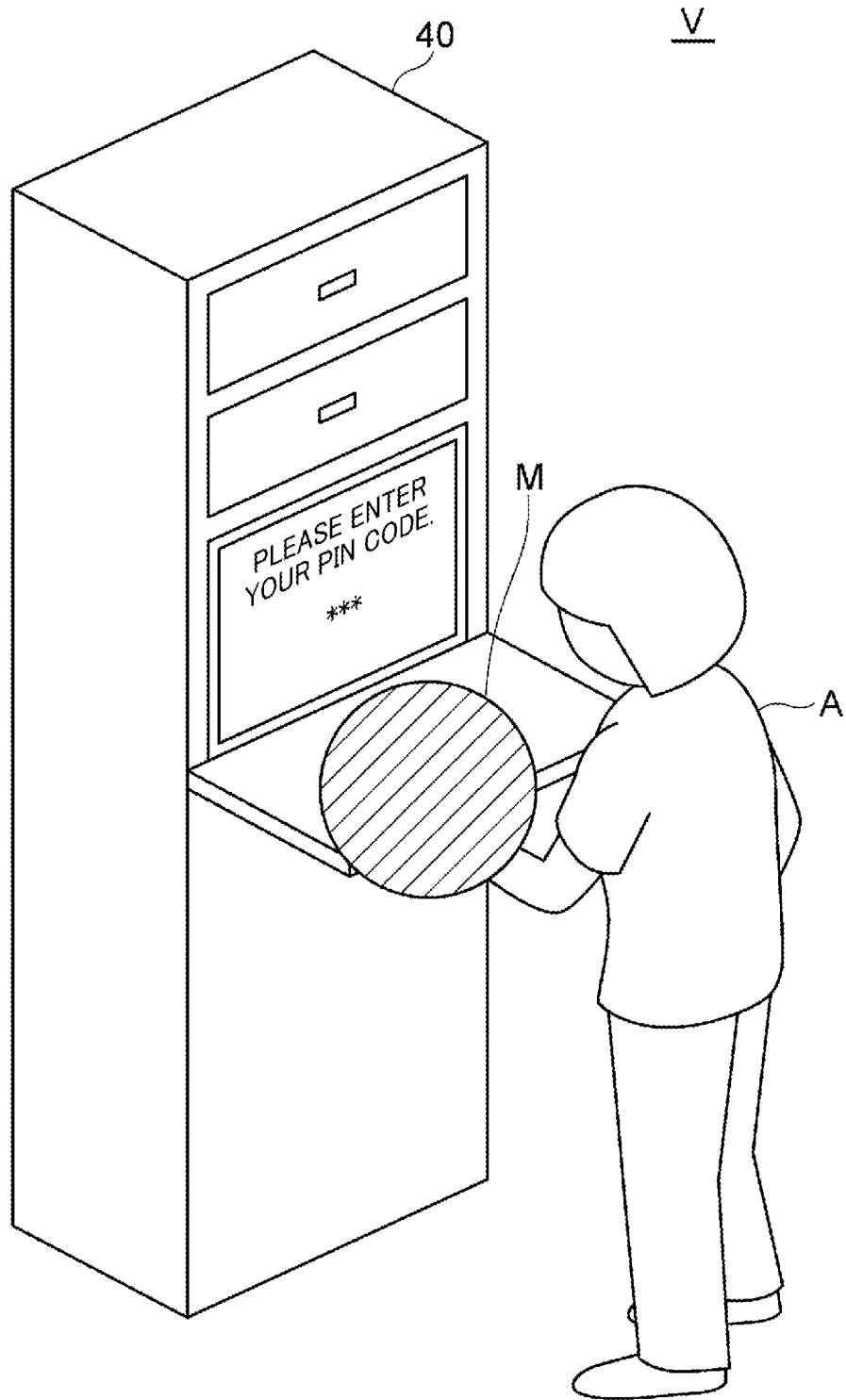
FIG. 7 is a diagram for explaining the second content image according to a second generation process.

FIG. 7 is a diagram for explaining the second content image according to the second content image data generated in the second generation process. In the example of FIG. 7, a mosaic object M having a substantially circular shape is superimposed and displayed so as to cover and hide a portion related to the specific action of the avatar A (here, a region including the hand A1). In this way, it is possible to provide the second user with an image without a sense of strangeness (an image in which the avatar A is not unnaturally stopped) while hiding the portion related to the specific action of the avatar A from the second user by the mosaic object M. However, in the second generation process, the action information (including the specific action information) of the avatar A is in the second content image data. There is thus a risk of having the content of the specific action grasped by the second user by analyzing the second content image data. To address this, the generator 13 may execute the following third generation process which combines the above-described advantages of the first generation process and the second generation process.

(Third Generation Process)

In the third generation process, the generator 13 generates second content image data related to a content image expressing an avatar performing a dummy action instead of a specific action. Similar to the second content data generated in the first generation process, this second content data does not include specific action information. More specifically, the second content data does not include action information actually obtained in step S2, but includes dummy action information representing a dummy action. The dummy action of the avatar is, for example, stored in advance in a location that can be referred to by the server 10 (for example, the content database DB, the auxiliary storage unit 103, or the like). In this case, when the specific state is detected by the detector 12, the server 10 can display, on the user terminal 30 of the second user, the second content image expressing the avatar performing the dummy action instead of the specific action.

Figure 8:
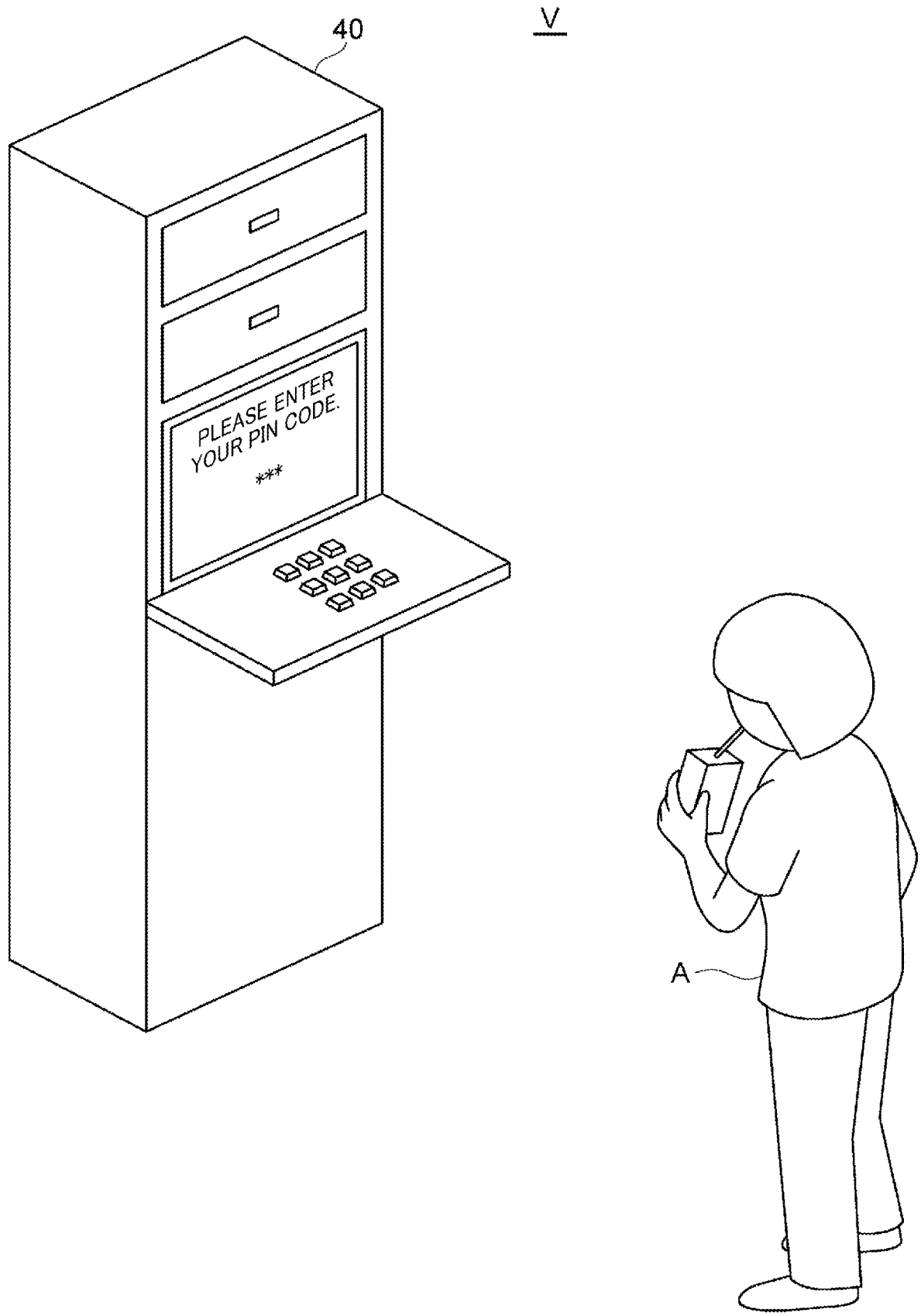
FIG. 8 is a diagram for explaining the second content image according to a third generation process.

FIG. 8 is a diagram for explaining the second content image according to the second content image data generated in the third generation process. The example of FIG. 8 shows the avatar A making a dummy action (here, the avatar A makes action of stopping and drinking a beverage) instead of an actual action (here, an action of inputting a password shown in FIG. 5). In this case, an image with no sense of strangeness can be provided to the second user, and the specific action of the avatar A can be hidden from the second user. Furthermore, the specific action information is not included in the second content image data. The confidentiality of the specific action is thus effectively achieved as in the case of the second content image data generated in the first generation process described above.

[Advantages]

As described above, a content distribution system according to one aspect of the present disclosure is a content distribution system that distributes content expressing a virtual space to a plurality of user terminals, including at least one processor. The at least one processor detects a specific state where an avatar corresponding to a first user arranged in the virtual space makes a specific action that should be hidden from a second user different from the first user, and displays a content image expressing the virtual space in a form such that the specific action is not visible on the user terminal of the second user, when the specific state is detected.

A content distribution method according to an aspect of the present disclosure is executed by a content distribution system including at least one processor. the content distribution method includes: detecting a specific state where an avatar corresponding to a first user arranged in the virtual space makes a specific action that should be hidden from a second user different from the first user; and displaying a content image expressing the virtual space in a form such that the specific action is not visible on the user terminal of the second user, when the specific state is detected.

A content distribution program related to one aspect of the present disclosure causes a computer to: detect a specific state where an avatar corresponding to a first user arranged in the virtual space makes a specific action that should be hidden from a second user different from the first user; and display a content image expressing the virtual space in a form such that the specific action is not visible on the user terminal of the second user, when the specific state is detected.

In such an aspect, in response to detection of a specific state where an avatar makes a specific action that should be hidden from another user (second user) as seen by the first user, the second user is provided with a content image (second content image of the above-described embodiment) expressing a virtual space in such a manner that the specific action cannot be visually recognized. Thus, the action of the avatar of the first user in the virtual space can be appropriately hidden from other users depending on the situation. That is, it is possible to display the action of the avatar which does not need to be hidden from other users in the content image provided to the second user, and not to display the action (specific action) of the avatar which needs to be hidden from other users in the content image provided to the second user, without a need of having the first user set in advance whether to share the action of the avatar with other users.

As in the above-described embodiment, in a case where the specific action is an action of inputting confidential information of the first user (for example, a PIN code of a bank, a credit card, or the like) in the virtual space, such an action is concealed from the second user, thus appropriately achieving the security in the virtual space.

Another conceivable example of the specific action is, for example, a case of the first user answering a question posed in a VR escape game or the like, at a predetermined area in the virtual space (e.g., a scene in which an answer is written on a virtual object imitating a whiteboard arranged in the virtual space via an avatar or an answer is presented by a gesture of the avatar). In this case, the action of answering via the avatar may be determined in advance as the specific action. For example, the specific state may be detected in response to detection of a state in which the avatar enters an answer area in a predetermined virtual space. According to such a configuration, it is possible to appropriately keep the answer content of the first user from being seen by the second user, and appropriately achieve the entertainment characteristics and fairness of the content.

Still another conceivable example of the specific action is an action that is not suitable for another person to see (e.g., actions of taking a rude pose to provoke others). Such an action may also be determined in advance as a specific action. In this case, an inappropriate action via the avatar of the first user is kept from being seen by the second user. Thus, it is possible to prevent the second user from feeling uncomfortable.

The content distribution system may be such that, of pieces of action information defining the action of the avatar in the virtual space, the at least one processor does not transmit specific action information defining at least the specific action to the user terminal of the second user. That is, for example, the first generation process of the above-described embodiment may be executed. In this case, the specific action information is not included in the data transmitted to the user terminal of the second user. It is thus possible to effectively achieve confidentiality of the specific action.

The content distribution system may be such that the at least one processor detects a state where the avatar is arranged within a predetermined distance range from a specific object as a target of the specific action, on the basis of a position of the specific object arranged in the virtual space and a position of the avatar in the virtual space, and detects the specific state in response to detection of the state. That is, for example, the first detection process of the above-described embodiment may be executed. In this case, it is possible to easily detect the specific state based on the position of the specific object and the position of the avatar. Further, by setting the distance range (threshold) to a large value to some extent, the specific state can be detected at a time point before the specific action of the avatar is actually started. As a result, the entire specific action can be reliably concealed from the second user.

The content distribution system may be such that the specific action includes an operation by the avatar on a non-shared object arranged in the virtual space and visible only to the first user. Further, the at least one processor may detect the specific state in response to an occurrence of the non-shared object in the virtual space. That is, for example, the second detection process of the above-described embodiment may be executed. In this case, the specific state can be easily detected in response to the occurrence of the non-shared object in the virtual space (for example, the non-shared object is generated in the virtual space based on an operation of the first user). In addition, the specific state can be detected at a time point before the actual operation on the non-shared object is started. It is thus possible to reliably conceal the entire specific action from the second user.

The above-described embodiment (second detection processing) deals with a case where the virtual object 40 is a non-shared object an example. However, the non-shared object does not necessarily imitate a real object, and may be, for example, a window or the like that appears in the air in front of the avatar of the first user. Further, the non-shared object is not limited to an object for inputting information to be concealed from another user (second user). Even in such a case, the following effects can be obtained by concealing, from the second user, the operation on the non-shared object via the avatar as a specific action. That is, it is possible to conceal, from the second user, the action of the avatar, which appears to make a incomprehensible gesture to the empty space (space in which non-shared objects are arranged, as viewed from the first user) when viewed from the second user. As a result, it is possible to avoid giving a sense of strangeness to the second user and to keep the feeling of immersion of the second user in the virtual space from being impaired.

The content distribution system may be such that the at least one processor detects the action information defining the specific action by comparing the action information defining the action of the avatar obtained by the user terminal of the first user with a prepared template, and detects the specific state in response to detection of the action information defining the specific action. That is, for example, the third detection process of the above-described embodiment may be executed. In this case, by preparing in advance a template corresponding to the action (specific action) of the avatar to be detected as the specific action, it is possible to detect any given action of the avatar as the specific action and to detect the state where the specific action takes place as the specific state.

The content distribution system may be such that the at least one processor displays the content image expressing the avatar performing a dummy action instead of the specific action, on the user terminal of the second user, when the specific state is detected. That is, for example, the third generation process of the above-described embodiment may be executed. In this case, it is possible to provide a content image with no sense of strangeness to the second user while achieving the confidentiality of the specific action.

The content distribution system may be such that the at least one processor displays the content image in which the object covering the specific action is arranged, on the user terminal of the second user, when the specific state is detected. That is, for example, the second generation process of the above-described embodiment may be executed. In this case, the confidentiality of the specific action can be ensured by the object that covers and hides the specific action. Note that the form of the object that covers and hides the specific action is not limited to the mosaic object M (see FIG. 7) described in the above embodiment. For example, the shape of the object is not limited to a circular shape, and may be another shape such as a rectangular shape. Further, the pattern of the object is not limited to mosaic. For example, the object may be constituted by any character such as a so-called smiley face or any object imitating any given decoration such as a star or a heart.

<Variation>

The present disclosure has been described above in detail based on the embodiment. However, the present disclosure is not limited to the embodiment described above. The present disclosure may be modified in various ways without departing from the spirit and scope thereof.

In the embodiment described above, the content distribution system 1 is configured using the server 10. However, the content distribution system may be applied to direct distribution between user terminals without intervening the server 10. In this case, each functional element of the server 10 may be implemented on any of the user terminals, or may be separately implemented on a plurality of user terminals. In this regard, the content distribution program may be implemented as a client program. The content distribution system may be configured using a server or may be configured without using a server.

Some of the functions of the server 10 described above may be executed by the user terminals 20 and 30. For example, the processing of the detector 12 of the server 10 may be executed by the user terminal 20. In this case, the transmitter 22 of the user terminal 20 may transmit the action information excluding the specific action information relating to the specific action of the avatar to the server 10. Such a configuration also bring about the same effects as those of the above-described content distribution system 1.

In the present disclosure, the expression "at least one processor executes a first process, a second process, and . . . executes an n-th process." or the expression corresponding thereto is a concept including the case where the execution bodies (i.e., processors) of the n processes from the first process to the n-th process change in the middle. That is, this expression is a concept including both a case where all of the n processes are executed by the same processor and a case where the processor changes during the n processes, according to any given policy.

The processing procedure of the method executed by the at least one processor is not limited to the example of the above embodiment. For example, a part of the above-described steps (processing) may be omitted, or each step may be executed in another order. Any two or more of the above-described steps may be combined, or some of the steps may be modified or deleted. Alternatively, other steps may be executed in addition to the steps described above.

DESCRIPTION OF REFERENCE CHARACTERS

1 Content Distribution System
10 Server
11 Receiver
12 Detector
13 Generator
14 Transmitter
20, 30 User Terminal
21 Obtaining Unit
22 Transmitter
23 Receiver
24 Display Controller
40 Virtual Object (Specific Object, Non-Shared Object)
101 Processor
A Avatar
DB Content Database
P1 Server Program
P2 Client Program
V Virtual Space

What is claimed is:

1. A content distribution system for displaying a virtual space to a plurality of user terminals, comprising at least one processor configured to:
   detect a state where an avatar corresponding to a first user performs a predetermined action in the virtual space, the predetermined action including an input operation of information secret to a second user, and the state including a state where the input operation is performed on a target virtual object of the input operation; and
   display a content image of the virtual space on a user terminal of the second user among the plurality of user terminals in response to detection of the state,
   wherein the at least one processor is further configured to:
      detect the state if a distance between a position of the target virtual object and a position of the avatar is less than a preset threshold such that the state is detected at a time point before the predetermined action is performed; and
      make the predetermined action not visible in the content image if the state is detected, and
   wherein the at least one processor is further configured to detect action information defining the predetermined action by comparing the action information with a prepared template.

2. The content distribution system of claim 1, wherein the at least one processor is further configured to:
   detect action information defining the predetermined action of the avatar; and
   prevent the action information from being transmitted to the user terminal of the second user.

3. The content distribution system of claim 1, wherein the at least one processor is further configured to detect when the avatar is positioned within a predetermined distance range from the target virtual object.

4. The content distribution system of claim 1, wherein the target virtual object includes a non-shared object in the virtual space, and
   wherein the non-shared object is visible to the first user and invisible to the second user.

5. The content distribution system of claim 4, wherein the at least one processor is configured to detect the state in response to occurrence of the non-shared object in the virtual space.

6. The content distribution system of claim 1, wherein the at least one processor is further configured to cause the user terminal of the second user to display the content image including the avatar performing a dummy action instead of the predetermined action, in response to detection of the state.

7. The content distribution system of claim 1, wherein the at least one processor is further configured to cause the user terminal of the second user to display the content image including an object covering the predetermined action, in response to detection of the state.

8. A content distribution method executed by a content distribution system including at least one processor, the method comprising:
 detecting a state where an avatar corresponding to a first user performs a predetermined action in a virtual space, the predetermined action including an input operation of information secret to a second user, and the state including a state where the input operation is performed on a target virtual object of the input operation; and
 displaying a content image of the virtual space on a user terminal of the second user among the plurality of user terminals in response to detection of the state,
 wherein the method further comprises:
  detecting the state if a distance between a position of the target virtual object and a position of the avatar is less than a preset threshold such that the state is detected at a time point before the predetermined action is performed; and
  making the predetermined action not visible in the content image if the state is detected, and
 wherein the method further comprises detecting action information defining the predetermined action by comparing the action information with a prepared template.

9. The content distribution method of claim 8, further comprising:
 detecting action information defining the predetermined action of the avatar; and
 preventing the action information from being transmitted to the user terminal of the second user.

10. The content distribution method of claim 8, further comprising:
 detecting when the avatar is positioned within a predetermined distance range from the target virtual object; and
 detecting when the avatar performs the predetermined action.

11. The content distribution method of claim 8, wherein the target virtual object includes a non-shared object in the virtual space, and
 wherein the non-shared object is visible to the first user and invisible to the second user.

12. The content distribution method of claim 8, further comprising causing the user terminal of the second user to display the content image including the avatar performing a dummy action instead of the predetermined action, in response to detection of the state.

13. The content distribution method of claim 8, further comprising causing the user terminal of the second user to display the content image including an object covering the predetermined action, in response to detection of the state.

14. A non-transitory computer-readable medium storing a content distribution program that causes a computer to perform functions comprising:
 detecting a state where an avatar corresponding to a first user performs a predetermined action in a virtual space, the predetermined action including an input operation of information secret to a second user, and the state including a state where the input operation is performed on a target virtual object of the input operation; and
 displaying a content image of the virtual space on a user terminal of the second user among the plurality of user terminals in response to detection of the state,
 wherein the function further comprises:
  detecting the state if a distance between a position of the target virtual object and a position of the avatar is less than a preset threshold such that the state is detected at a time point before the predetermined action is performed; and
  making the predetermined action not visible in the content image if the state is detected, and
 wherein the function further comprises detecting action information defining the predetermined action by comparing the action information with a prepared template.

15. The non-transitory computer-readable medium of claim 14, wherein the functions further comprise:
 detecting action information defining the predetermined action of the avatar; and
 preventing the action information from being transmitted to the user terminal of the second user.

16. The non-transitory computer-readable medium of claim 14, wherein the functions further comprise:
 detecting when the avatar is positioned within a predetermined distance range from the target virtual object; and
 detecting when the avatar performs the predetermined action.

17. The non-transitory computer-readable medium of claim 14, wherein the target virtual object includes a non-shared object in the virtual space, and
 wherein the non-shared object is visible to the first user and invisible to the second user.

18. The non-transitory computer-readable medium of claim 14, wherein the functions further comprises causing the user terminal of the second user to display the content image including the avatar performing a dummy action instead of the predetermined action, in response to detection of the state.

19. The non-transitory computer-readable medium of claim 14, wherein the functions further comprises causing the user terminal of the second user to display the second content image including an object covering the predetermined action, in response to detection of the state.

* * * * *